United States Patent [19]
Berg

[11] Patent Number: 4,468,961
[45] Date of Patent: Sep. 4, 1984

[54] FLUID DIRECTION METER SUITABLE FOR ANGLE OF ATTACK METER FOR AIRCRAFT

[76] Inventor: Lauren V. Berg, 5145 Harvest Estates, San Jose, Calif. 95135

[21] Appl. No.: 454,497

[22] Filed: Dec. 29, 1982

Related U.S. Application Data

[63] Continuation of Ser. No. 198,116, Oct. 17, 1980, abandoned.

[51] Int. Cl.³ .............................................. G01C 21/00
[52] U.S. Cl. ..................................... 73/180; 116/265; 137/823
[58] Field of Search ...................... 73/180, 189, 188; 137/823, 822; 116/265

[56] References Cited

U.S. PATENT DOCUMENTS

| | | | |
|---|---|---|---|
| 2,660,056 | 11/1953 | Schuck | 73/180 |
| 3,069,906 | 12/1962 | Eiland | 73/180 |
| 3,327,529 | 6/1967 | Bowles | 73/180 |
| 3,580,069 | 5/1971 | Warren | 73/180 |
| 3,592,042 | 7/1971 | Martinez | 137/823 |

*Primary Examiner*—Charles Frankfort
*Assistant Examiner*—Denis E. Corr
*Attorney, Agent, or Firm*—John J. Leavitt

[57] ABSTRACT

Presented is a method and means for monitoring the angle of attack of an airfoil and displaying the monitored angle of attack as a visual reference to the pilot.

18 Claims, 19 Drawing Figures

FLUID DIRECTION METER SUITABLE FOR ANGLE OF ATTACK METER FOR AIRCRAFT

This is a continuation of application Ser. No. 198,116, filed Oct. 17, 1980 and now abandoned.

BACKGROUND OF THE INVENTION

1. Field of the Invention

This invention relates to a method and means for determining the angle of attack of an airfoil on an aircraft, and particularly to a method and means utilizing a fluidic amplifier operating in conjunction with a rotatable indicator dial to accurately indicate the angle of attack of an airfoil.

2. Description of the Prior Art

The prior art relating to this invention is believed to be found in Class 116, sub-classes 265 and 266; Class 23, sub-classes 178, 179 and 180; sub-class 27 AT. A search through the field of search indicated has resulted in the following eleven patents; U.S. Pat. Nos. 1,504,785; 2,008,885; 2,237,306; 2,352,955; 2,499,284; 2,637,294; 2,367,295; 2,923,152; 3,452,707; 3,548,854; and 3,630,169.

As will be seen from the prior art patents listed above, the prior art is repleat with many different methods and means for gauging and/or indicating the angle of attack of an airfoil or other type blade, such as a turbine blade. Thus, U.S. Pat. No. 1,504,785 relates to a device for indicating the attitude of an aircraft and utilizes the deep pressures acting on the upper and lower surfaces of the airfoil to operate a pair of diaphrams connected for displacement in response to variations in such pressure, a lever arm actuated by deflection of each diaphram, and a helix operatively engaged by the lever to affect rotation of the helix upon lateral displacement of the lever. An indicator arm on the helix cooperates with a graduated scale to indicate the attitude of the airplane.

U.S. Pat. No. 2,008,885 relates to an artificial horizon in which a quantity of liquid is contained within a capillary tube which is in turn connected to radially outwardly extending capillary tubes with orifices adjacent the outer ends of the wings of an aircraft. The pressure on the orifices is related to the attitude of the airplane and such pressures control the position of the fluid in the artificial horizon to thus simulate the attitude of the airplane in a visible way for the benefit of the pilot.

U.S. Pat. No. 2,237,306 relates to an angle of attack indicator for aircraft airfoil in which the standard pitot-static arrangement is used in combination with a conventional "yaw head". The pitot-static system is connected by appropriate tubing into a chamber having a diaphram connected to a spindle. The yaw head orifices are connected by appropriate tubes to a second chamber having a diaphram connected to a spindle. The spindles are interconnected in such a way that they operate an indicator needle on an appropriate angle of attack scale. Thus, while this device appropriately indicates the angle of attack, it does so by a structure that is completely different from the structure forming the subject matter of this invention.

U.S. Pat. No. 2,352,955 relates to an angle of attack indicator utilizing the conventional pitot-static system to derive impulses acting on two different diaphrams, the ratio of the impulse on the diaphrams being a measure of the angle of attack. Thus, while dynamic pressure from two separate points is applied to a mechanism, the mechanism to which such impulses are applied is completely different from the structure forming the subject matter of this invention.

U.S. Pat. No. 2,499,284 relates to a stall indicator device for airplanes and utilizes the dynamic pressure of air channeled into a bubble chamber, thus causing bubbles to continuously rise through the fluid in the bubble chamber and visible to the pilot. When the angle of attack of the airfoil increases to a critical angle, the bubbles cease and such cessation of bubbling is also visible to the pilot, thus warning him that a critical angle has been achieved.

U.S. Pat. No. 2,637,295 also relates to an angle of attack device for aircraft, but utilizes an unstable vane controlled by the impact of the airmass for pivotal movement to open and close a valve that admits air into a "motor" in the form of a flexible bladder. Expansion and contraction of the flexible bladder controls the position of laterally extending rods into or out of the line of vision of the pilot to alert him to a stall condition.

U.S. Pat. No. 2,637,294 is similar to the structure taught by U.S. Pat. No. 2,637,295 in that an unstable vane is utilized to control a valve that admits air to a warning device, in this case, the warning device being a whistle.

U.S. Pat. No. 2,923,152 relates specifically to a sensing device that presents a multitude of orifices to the air mass ahead of an airfoil but is devoid of any disclosure of structure for indicating angle of attack as a result of the impact of air on the separate orifices.

U.S. Pat. No. 3,452,707 utilizes the concept of a fluid amplifier in conjunction that the stall or shock sensor for aircraft. A pure fluid amplifier is utilized to power an indicator piston, thus indicating or reflecting a stall condition or shock wave. While a fluid amplifier is utilized, the structure taught by this patent is distinctly different from the structure forming the subject matter of this invention.

U.S. Pat. No. 3,548,854 also relates to an angle of attack device utilizing the principle of a fluid amplifier. Structurally, the device provides a plurality of apertures in the underside of the wing near the leading edge, the apertures being arranged in a series extending transversely of the airfoil and receiving predetermined distances from the leading edge as the series progresses. As the angle of attack increases, a segment of the air which would normally flow below the airfoil reverses its direction and flows over the top of the airfoil. The point at which this reversal occurs on the underside of the airfoil is at varying distances with respect to the leading edge of the airfoil. Each orifice in the underside of the wing is connected to a fluid amplifier. Additionally, a power stream of input air is admitted to the fluid amplifier and this stream of power fluid is channeled by the fluid amplifier to a predetermined output. When a signal is received from one of the apertures or orifices on the underside of the wing, the power stream is switched to a second output channel. The fluid amplifier is biased by commuting communicating part of the power fluid of the amplifier into a control channel. Each of the bias amplifiers is connected to an indicator which indicates the flow through the output channel and the readings of the indicators will give a digital readout of the angle of attack. Again, while the principle of fluid amplification is utilized in this device, the means by which it is utilized is completely different from the structure forming the subject matter of this invention.

Lastly, U.S. Pat. No. 3,630,169 relates to a stall warning indicator having no moving parts and mounted on the leading edge of an aircraft near the point of stagnation of airflow when the stall condition occurs. Structurally, the device utilizes a pair of orifices working in conjunction with the output of a transmitter of an acoustic wave or jet air stream. The orifices or detectors are connected to a differential sensor in such a manner that when the stagnation point passes the axis of the transmissions, the differential sensor produces a signal to warn of an impending stall.

It will thus be seen from the prior art described above that many and varied stall warning devices are represented by the prior art. The prior art patents noted and discussed above are obviously not the only patents that relate to this subject matter. These patents were selected as being representative of the prior art as it relates to the concept of method and means depicted in the invention forming the subject matter of this invention.

Accordingly, it is one of the important objects of the present invention to provide a method and means for indicating the angle of attack of an airfoil which utilizes the concept of fluidic amplification in conjunction with a meter capable of being mounted on the instrument panel of an airplane and which depicts the angle of attack of the wing of the airplane at a glance.

Another object of the invention is the provision of an angle of attack meter for aircraft that is simple in its construction, economical to manufacture and accurate in its representation of the angle of attack of the airplane.

Still another object of the invention is the provision of an angle of attack meter for aircraft that is applicable in either non-pressurized or pressurized airplanes.

Another object of the invention is the provision of an angle of attack meter for aircraft that utilizes directly the output from a fluid amplifier to deflect a card or pointer a predetermined amount correlated to the angle of attack of the aircraft.

Yet another object of the invention is the provision of an angle of attack meter for aircraft which utilizes the output from a fluidic amplifier to rotate a card through a predetermined angle of rotation representative of the angle of attack of the wing of the aircraft, which angle of rotation of the card may be depicted either directly by rotation of the card or electrically through impulses generated by rotation of the card and which are displayed digitally for the benefit of the pilot.

The invention possesses other objects and advantages, some or which, with the foregoing, will be apparent from the following description and the drawings. It is to be understood however that the invention is not limited to the embodiment illustrated and described, since it may be embodied in various forms within the scope of the appended claims. Furthermore this invention is not limited to determining the angle of attack of an airfoil, it can also be used for measuring the direction of flow of any fluid or gas.

SUMMARY OF THE INVENTION

In terms of broad inclusion, the method and apparatus comprising the angle of attack meter for aircraft of this invention comprises a sensor appropriately mounted at/or adjacent the leading edge of the airfoil which is in turn connected to a fluidic amplifier, preferably mounted within the cockpit, and operatively associated with a rotatable dial calibrated to provide a visual indication of the angle of attack of the airfoil at any given moment. The sensor may be located at any location so long as it is in the air mass through which the airplane is moving and out of slipstream of the propeller. More specifically, the sensor means receives and channels a column of impacted air through appropriate conduits to the input side of the fluidic amplifier, the output from the fluidic amplifier being a single stream or jet of air having a velocity and a direction that is dependent upon and related to the angle of attack of the airfoil on which the sensor means is mounted. The jet of air emanating from the fluidic amplifier acts on appropriately positioned and angled vanes formed on a rotatable dial one face of which is calibrated to visually indicate the angle of attack opposite an appropriate fixed index mark. Alternatively, the rotatable vaned member may carry a pointer which sweeps over a fixed scale to indicate the angle of attack.

DESCRIPTION OF THE PREFERRED EMBODIMENT

Figure 1:
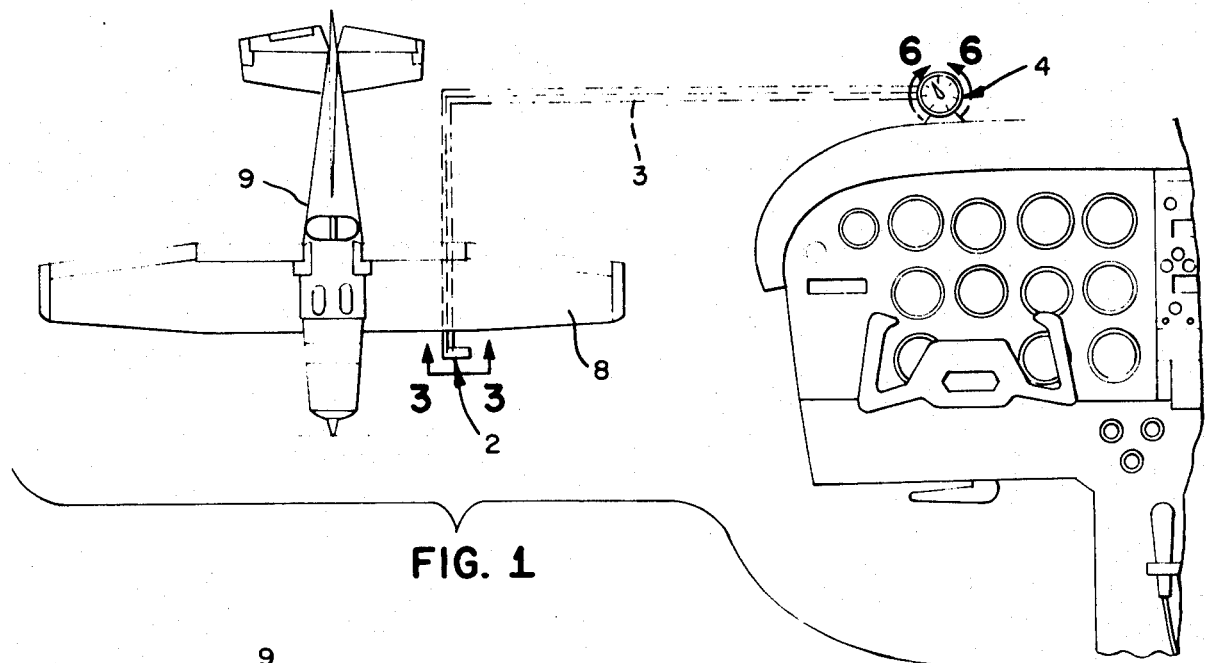
FIG. 1 is a composite view in perspective illustrating the relationship between the placement of the angle of attack meter of this invention on the instrument panel of an aircraft and the sensor means mounted below the wing of the aircraft out of the propeller slipstream.
Figure 2:
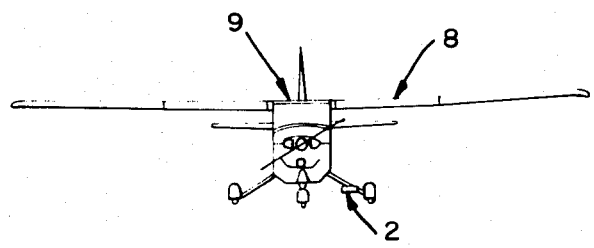
FIG. 2 is a front elevational view of an aircraft showing the sensor means mounted on the landing gear out of the slipstream of the propeller.

In terms of greater detail, and referring to FIG. 1, the method and means forming the subject matter of this invention comprises a sensor unit or means designated generally by the numeral 2 connected by appropriate conduits 3 to a meter mechanism designated generally by the numeral 4 and which includes a fluidic amplifier designated generally by the numeral 6 mounted within the meter in association with an appropriate rotor or fluidic transducer designated generally by the numeral 7 and adapted to receive air stream impulses from the fluidic amplifier to visually indicate the angle of attack of the airfoil 8 on the airplane 9.

Figure 3:
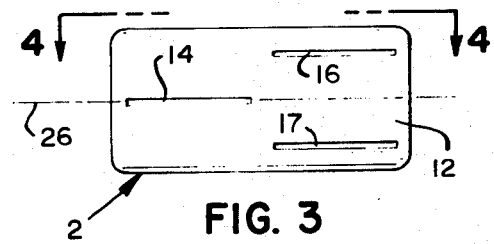
FIG. 3 is a front elevational view of the preferred form of sensor means.
Figure 4:
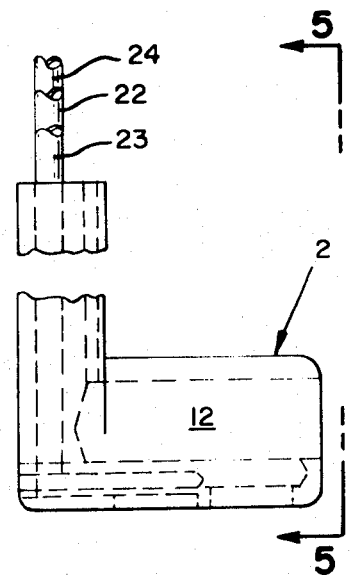
FIG. 4 is a plan view of the embodiment of the sensor means illustrated in FIG. 3 taken in the direction of the arrows on line 4—4 of FIG. 3.
Figure 5:
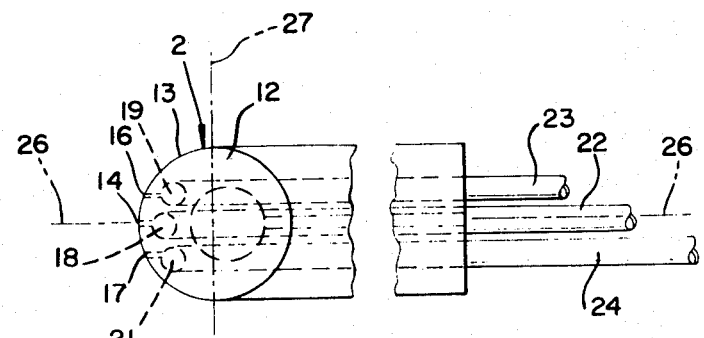
FIG. 5 is an end elevational view taken in the direction indicated by the arrows on line 5—5 of FIG. 4.

Referring specifically to the embodiment of the sensor means 2, illustrated in FIGS. 1 through 5, inclusive, the sensor means as there illustrated comprises a cylindrical body 12, conveniently fabricated from an appropriate material such as aluminum, copper or other appropriate material, even including a synthetic resinous material, and which is provided on one peripheral surface 13 with elongated slots 14, 16 and 17, each of the slots extending through the wall of the cylindrical body 12 and communicating on the interior of the body 12 with respective passageways 18, 19 and 21 as illustrated in FIG. 5. Each of the passageways 18, 19 and 21, are connected in turn by appropriate conduit, conveniently flexible tubing, and designated as illustrated in FIG. 4 by numerals 22, 23 and 24, respectively.

Figure 15:
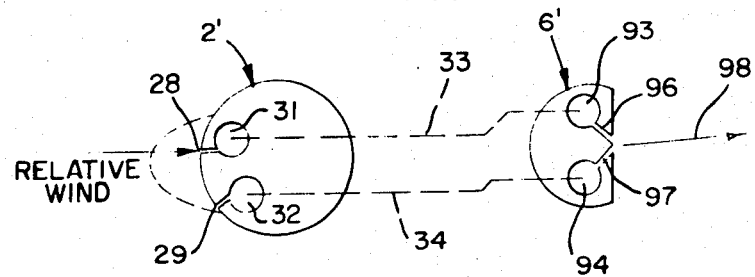
FIG. 15 is a schematic view of a two port embodiment of the sensor means, the amplifier and connecting conduit.

Again, referring to FIGS. 3 and 5 of the drawings, it will be seen that the body 12 is generally symmetrical about a longitudinal axis included within a horizontal plane designated generally by the numeral 26, and that the slot 14 is symmetrically disposed and included within the plane 26, while slots 16 and 17 are disposed on opposite sides of the plane 26 by equal amounts. It will also be seen that all of the slots 14, 16 and 17 are of equal length and of equal width and that the respective passageways with which they communicate are also of the same diameter. Additionally, it will be seen that the flexible tubing 22, 23 and 24 connecting the respective passageways 18, 19 and 21 are identical in their cross-sectional configuration, each having the same inside diameter and being constructed from the same material. The importance of these characteristics lies in the need that the openings or apertures presented by the slots 14, 16 and 17 to the body of relative wind against which the sensor body is directed be as nearly equal to each other as possible and that each of the apertures admit precisely proportional amounts of air, depending solely on the angular position of the apertures in relation to the direction of the relative wind to which they are presented or, stated another way, in relation to the distribution of pressure near the stagnation point (leading edge) of the airfoil or sensor body. It should be understood however that while a symmetrical arrangement has been illustrated in FIGS. 3, 4, 5 and 10, the slots or apertures in the sensor means that are presented to the relative wind may be arranged in a non-symmetrical arrangement as illustrated schematically in FIGS. 11 and 15. Additionally, while the illustrations in FIGS. 3, 4, 5 and 10 show the use of three such apertures or slots in the sensor means, it should be understood that a sensor unit using only two slots or apertures may be constructed, as illustrated in FIG. 15. A sensor utilizing four or more slots could also be constructed. However, it it believed that the embodiment illustrated in FIGS. 3, 4, 5 and 10 utilizing three slots or apertures sets forth the preferred mode of operation of the invention and for that reason the description of the invention proceeds with respect to a three aperture sensor unit.

Referring to FIG. 5, it will be seen that with respect to a vertical plane 27 that includes the longitudinal axis of the sensor body 12 of sensor unit 2, the passageways 18, 19 and 21 extend parallel to such plane and are spaced therefrom in a direction toward the surface 13 within which the apertures or slots 14, 16 and 17 are formed. It should be noted that the passageways 18, 19 and 21 are arranged in an arcuate pattern, with each of the passageways ideally being spaced equally from the surface 13 of the sensor unit so that the structural characteristics of each of the slots 14, 16 and 17 in association with their respective passageways 18, 19 and 21 present similar functional characteristics to the relative wind in terms of cross-sectional opening of the apertures and frictional resistance imposed by the slots and the walls that define the slots. Thus, referring to FIG. 5, it will be seen that the passageway 18 is generally cylindrical and symmetrical about an axis that is spaced farther from the plane 27 that includes the longitudinal axis of the sensor body than the longitudinal axis of the passageway 19 and 21. However, it should be noted that the axis of each of the passageways 18, 19 and 21 is radially equidistant from the peripheral surface 13 with which it is associated.

Thus, when mounted on an airplane as depicted in FIG. 1, increasing the angle of attack of the airfoil 8, as when decreasing the airspeed while maintaining constant altitude, is equivalent to rotating the sensor body 12 about the longitudinal axis 26 so as to move all of the passageways 18, 19 and 21 clockwise about such longitudinal axis, thus repositioning each of the passageways in relation to the vertical plane 27. For instance, the angle of attack may be increased so that the passageway 17 replaces the passageway 18 in the plane 26 so that passageways 18 and 19 lie above the plane 26, as do the respective slots that communicate with these passageways. On the other hand, with higher airspeeds or lighter loads, with a small angle of attack, it may be considered that the sensor body 12 is functionally rotated counterclockwise so as to place the passageway 19 and the slot 16 with which it is related within the plane 26, thus placing both passageways 18 and 21 and their respective slots 14 and 17 below the plane 26.

It should be understood that such movement of the airfoil and sensor body so as to reposition the airfoil and sensor slots 14, 16 and 17 with respect to the relative wind results in a quantitative variation of the air being admitted through the slots 14, 16 and 17 and thus passing through the connecting tubes 22, 23 and 24 respectively. It is the variation in the volume and velocity of the air transported through these flexible tubes that is imposed on the fluidic amplifier and then on the rotor or other transducer to indicate the angle of attack of the airfoil on which the sensor unit is mounted.

As indicated above in FIG. 15, the sensor unit 2' may include only two apertures or sensor slots 28 and 29, communicating appropriately with passageways 31 and 32, each of which in turn is connected by an appropriate conduit 33 or 34, respectively, with a fluidic amplifier 6 as illustrated. Whether the sensor unit possesses three sensor apertures as illustrated in FIG. 5, only two sensor apertures as illustrated in FIG. 15, or more than 3 apertures, the principle of operation is the same and all that is required is that the fluidic amplifier also have the same number of ports as the sensor.

It will of course be understood that the sensor unit 2 as illustrated in FIGS. 1-5 is intended to be mounted in relation to the airfoil so that it projects into the relative wind created by movement of the airplane and yet be mounted outside of the slip stream of the propeller so that the pressure impulses that are received by each of the sensor apertures 14, 16 and 17 are not affected except by the change of relationship between the sensor slots 14, 16 and 17 and the direction of relative wind impacting on the sensor body. In this regard, it should be understood that the sensor unit may incorporate an appropriate heating element in the same way that a pitot tube contains an appropriate heating element controlled by an appropriate switch within the cabin of the airplane to energize the heater unit to prevent moisture on the sensor unit from freezing and plugging the apertures or sensor slots 14, 16 and 17. It should also be understood that while the sensor slots 14, 16 and 17 are illustrated as being slots, i.e., elongated openings, the openings may also be circular in their configuration.

Referring to the embodiment of the invention illustrated in FIGS. 6 through 9, it will be noted that the meter mechanism designated generally by the numeral 4, includes an outer housing 28, preferably tubular in form as illustrated and provided with a hollow interior 29 defined by the tubular housing wall 28, a rear wall 31 and a face plate 32, the latter being transparent and attached to the end of the tubular housing portion 28 on the end thereof opposite the rear wall 31. The face plate 32 is secured to the tubular housing portion 28 in any suitable manner. Thus, the tubular wall 28, rear wall 31 and transparent plate 32 define a hollow housing 33, with the rear wall 31 being apertured as at 34, the aperture being appropriately covered with a screen 36 to prevent the entrance into the housing of insects or other foreign bodies. Alternatively, the rear wall 31 may be omitted and the screen 36 extended completely across the tubular housing 28. In most light planes having non-pressurized cabins, the pressure inside the housing 33 is the same as the pressure within the cabin of the airplane, which should be nearly the same as the ambient pressure on the outside of the airplane. For aircraft that are pressurized or which have a tightly sealed cabin, it is important that the interior of the housing 33 be at the same pressure as the ambient pressure outside the aircraft, and for that purpose, the housing 33 may be provided with a vent system 37 one end of which is connected to and communicates with the interior of the housing 33 and the other end is connected through an appropriate passageway 38 with the exterior atmosphere. Increased meter sensitivity may be accomplished by connecting this vent to a vacuum source or locating the exterior end of the vent in a low pressure region of the aircraft.

Within the housing 33 there is provided a transversely extending plate 39 having a central aperture 41 therethrough and having on its front face 42 indicia 43 correlated to the degrees of angle of attack of the airfoil on which the sensor unit 2 is mounted. The outer peripheral edge 44 of the plate 39 abuts the inner periphery 46 of the tubular wall 28 and is secured thereto in any suitable manner. It should be noted that the plate 39 bearing indicia 43 is spaced somewhat from face plate 32 to provide a chamber 47 between the transparent face plate 32 and the plate 39 for purposes which will hereinafter be explained.

Also provided within the interior 29 of the housing 33 are two additional transverse walls 48 and 49 spaced apart so as to provide a drive chamber 51 disposed between the plate 48 and the plate 39, and a rotor chamber 52 disposed between the plate 49 and the plate 48. Each of the plates 48 and 49 are suitably attached to the inner surface 46 of the tubular housing wall 28.

Figure 7:
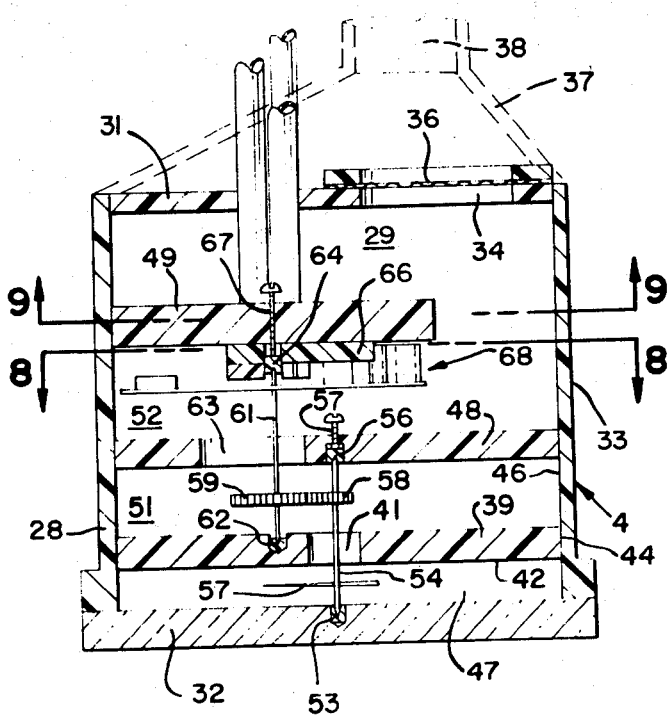
FIG. 7 is a horizontal cross sectional view taken in the plane indicated by the line 7—7 in FIG. 6.

As indicated in FIG. 7, the transparent face plate 32 supports a suitable bearing 53 for the forward end of a rotatable drive shaft 54 the other end of which is rotatably carried in a bearing 56 mounted on the plate 48. Preferably, the axis of rotation of shaft 54 is coincident with the central axis of the housing 33 and there is mounted on the forward end portion of the shaft 54 a pointer 57 adapted to rotate with the shaft 54 and to sweep over the indicia 43 to indicate the specific degree of angle of attack of the airfoil and the sensor unit. Any suitable means, such as a screw 57, may be utilized in association with the bearing 56 to eliminate end play in the shaft 54.

To drive the shaft 54, there is mounted thereon, preferably in the chamber 51, a driven gear 58 suitably engaged by a driver gear 59 fixed on a shaft 61, the forward end of which is appropriately journaled on a bearing 62 mounted on transverse wall 39. The shaft 61 extends rearwardly through aperture 63 in transverse wall 48, and is journaled at its opposite end on a bearing 64 suitably supported in the fluidic amplifier base member 66 which is in turn supported on transverse wall 49. As with the shaft 54, the shaft 61 may be provided with an appropriate adjustment means such as a screw 67 to eliminate end play. Mounted on shaft 61 for rotation therewith in rotor chamber 52 is a rotor designated generally by the numeral 68, the rotor being provided adjacent its circular periphery with a multiplicity of angularly disposed vanes designated collectively by the numeral 69.

Figure 8:
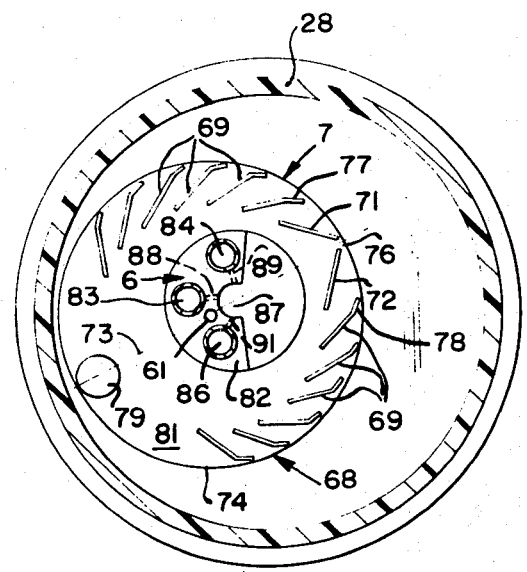
FIG. 8 is a vertical cross sectional view taken in the plane indicated by the line 8—8 in FIG. 7.

It will be noted that the vanes 69 are each angularly disposed with respect to the central axis and with respect to each other. Referring to FIG. 8, it will be seen that there are two primary vanes 71 and 72, each angularly disposed with respect to a plane including the rotative axis of the rotor and shaft 61, as depicted in FIG. 8 by the line 73. The ends of the vanes 71 and 72 next adjacent the outer periphery 74 of the rotor are spaced apart to provide an aperture 76 therebetween for purposed which will hereinafter be explained. Again as indicated in FIG. 8, the next successive pair of vanes 77 and 78 are also angularly disposed with respect to the plane 73 and are spaced on opposite sides thereof in the same manner that the vanes 71 and 72 are spaced on opposite sides of the plane 73. However, note that the vanes 77 and 78 are disposed at a different angle to the plane and to the rotative axis of the rotor than the vanes 71 and 72. In like manner, successive pairs of vanes on opposite sides of the plane 73 are spaced from the preceding vanes and related to the plane 73 at different angles as shown. Because the vanes do not extend all the way around the rotor, and because it is essential that the rotor be balanced so that there will be no tendency for the rotor, in the absence of an exterior motivating force, to rotate in one direction or the other, the rotor is provided with a weighted body 79 mounted on the rotor surface 81 adjacent the outer periphery and in a position and of such weight as to balance the weight and positions of the vanes. Thus, the rotor may be rotated in the absence of any outside force to any selected position and its position will not be inforced by forces other than the air discharged from the fluid amplifier.

Mounted on the fluidic amplifier base member 66 is a fluidic amplifier head designated generally by the numeral 82 and including chambers 83, 84 and 86 each of which chambers, respectively, receive flexible tubings 22, 23 and 24. The fluidic amplifier chambers 83, 84 and 86 are communicated to the fluidic amplifier recess 87 by appropriate passageways 88, 89 and 91, respectively. It should be understood that the fluidic amplifier base plate 66 and that the rotor 7 is arranged in relation to the fluidic amplifier head 82 so that air discharged from the fluidic amplifier recess 87 impinges on one or more of the vanes 69 depending upon the direction from which the stream or jet of air emanates from the fluidic amplifier recess 87.

Figure 12:
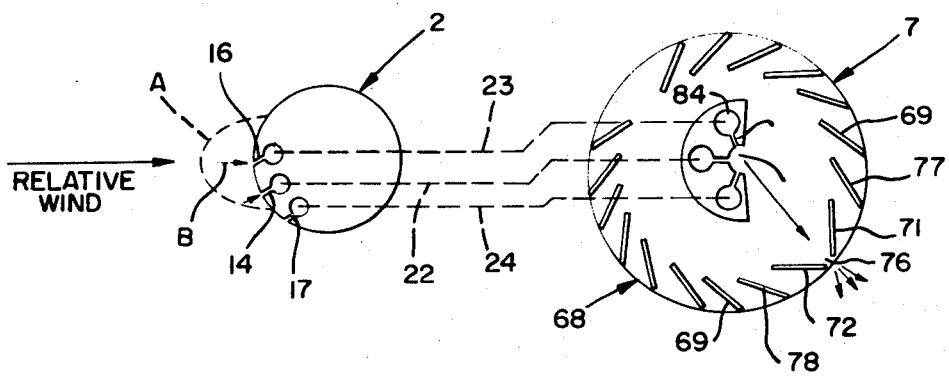
FIGS. 12 through 14 illustrate schematically the positional relationship of the rotor in response to the jet of air emanating from the fluidic amplifier as controlled by the distribution of air pressure in relation to the sensor orifices.

The direction of the jet of air from the fluidic amplifier recess 87 is determined by the angle of attack of the airfoil in relation to which the sensor unit 2 is mounted, and the relative volumes and velocity of air emanating from the chambers 83, 84 and 86 through their respective passageways 88, 89 and 91. Thus, if the airfoil is at a zero angle of attack the predominant force of the relative wind will be imposed through the port 16 in the sensor unit 2 arranged as depicted in FIG. 12. Air impacting this port 16 will be transmitted through the tube 23 to the fluidic amplifier chamber 84 and will pass from that chamber through passageway 89 and will egress from recess 87 in a direction as indicated by the arrow in FIG. 12, and with a force such that it impacts vanes 71 and 72 adjacent the aperture 76, thus rotating the rotor to bring it into a zero angle of attack position in which the vanes 71 and 72 are symmetrically disposed on opposite sides of the jet of air emanating from the recess 87.

In like manner, as the angle of attack is increased or decreased, a dominant amount of the relative wind will impact ports 14 or 17, causing variations in the volume and velocity of air emanating from fluidic amplifier passageways 88, 89 and 91, with the result that a jet of air will emanate from the fluidic amplifier 87 that is the sum total of the three jets, being determined in its direction by the angle of attack of the airfoil and sensor unit and the relative amounts of air entering sensor ports 14, 16 and 17. Such jet of air will impact upon one of the vanes 69, 71, 72, 77 or 78, and depending upon the direction in which the jet of air is directed, the rotor will rotate in one direction or the other, indicating the angle of attack. After the air impacts the vane, it passes into the interior of the housing and escapes through aperture 92 formed in transverse wall 49 and shown best in FIG. 9 as being an arcuate opening of sufficient size so as to not impede the escape of air into the cabin in an airplane that does not have a pressurized cabin, or into the duct system 37-38 in a pressurized airplane.

Figure 13:
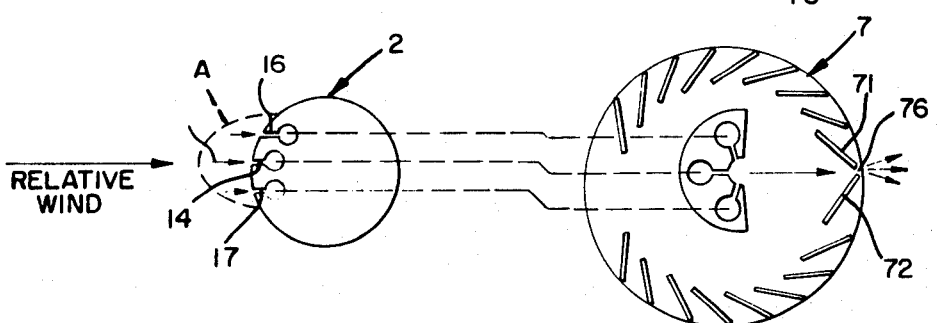
Figure 14:
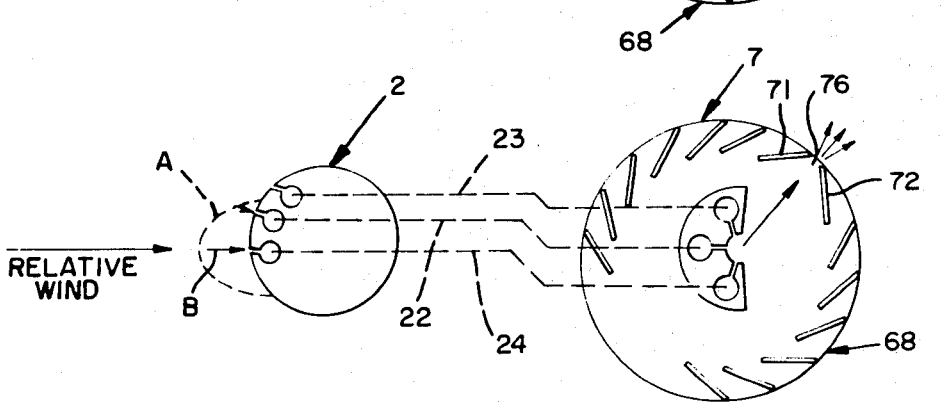

In an effort to provide a better understanding of the mode of operation of the invention, reference is made to the schematic illustrations in FIGS. 12 through 14. The broken line A in each illustration defines the distribution of air pressure on the surface 13 of the sensor body 2 and the ports 14, 16 and 17 at different angles of attack. As indicated by the vector B in each illustration, the maximum pressure acting on any given port 14, 16 or 17, acts when the port is aligned with the relative wind. This pressure is equal to the dynamic or impact pressure of the relative wind on the port minus the static pressure, and is represented in the figures in direction and extent by the vector B. I have found that I can increase the amplifier output angle by having the stagnation point for zero angle of attack near port 16 and the stagnation point for a stalled condition near port 17, as shown in FIG. 12. Thus, at zero angle of attack (FIG. 12) the rotor responds to a jet of air emanating from the recess 87 that is dominated by the air flow through port 16, conduit 23, and passage 89.

In like manner, in FIG. 13, the rotor responds to the jet of air from recess 87 that is dominated by air impacting port 14, passing through conduit 22 and passageway 88 of the fluidic amplifier, rotating to indicate an increased angle of attack. FIG. 14 in like manner illustrates the domination of the jet of air emanating from the fluidic amplifier by air impacting port 17 at a high angle of attack near or at stall, with a corresponding rotation of the rotor under the impetus of the jet of air from recess 87.

Figure 10:
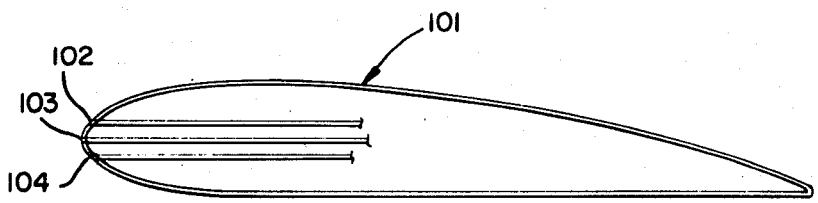
FIG. 10 is a cross sectional schematic view illustrating a symmetrical pattern of the orifices of the sensor means in an embodiment in which an airfoil forms the sensor means.
Figure 11:
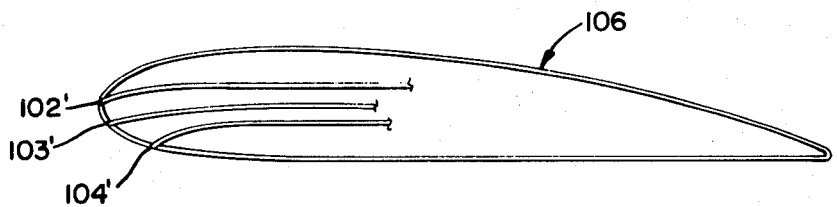
FIG. 11 is a view similar to FIG. 10 but showing a non-symmetrical pattern of the orifices of the sensor means, in which the orifices are spaced progressively from the leading edge of the airfoil sensor and along the underside thereof.

Referring to FIG. 15, it will there be seen that the fluidic amplifier head 6' contains only two chambers 93 and 94 connected, respectively, by the flexible conduits 33 and 34. Outlet passageways 96 and 97 communicating with the fluidic amplifier chambers 93 and 94, respectively, converge toward their outlet ends so that the jet of air discharged from each is influenced in its direction by the impact of the two jets, the two jets comingling to create one single discharge jet that is discharged in the direction of arrow 98, and which will impact against the vane of the rotor in correlation to the angle of attack of the sensor unit 2' and the airfoil on which it is mounted. In this illustration, the port 28 is positioned at zero angle of attack, while port 29 is positioned to reflect an angle of attack at or near a stalled condition. FIG. 10 illustrates an embodiment in which the airfoil designated generally by the numeral 101 is provided with ports 102, 103 and 104 formed in the leading edge thereof as illustrated. In this embodiment the ports are symmetrically disposed with respect to the chord line of the airfoil, while in the airfoil designated by the numeral 106 in FIG. 11, the ports 102', 103' and 104', are dispersed in a different pattern, the port 102' being on/or near the chord line and the ports 103' and 104' being dispersed below the chord line. Additionally, as previously discussed, each of the ports in the airfoils is connected by appropriate flexible conduits or tubing with an appropriate fluidic amplifier head, such as illustrated in FIGS. 3-5.

Figure 6:
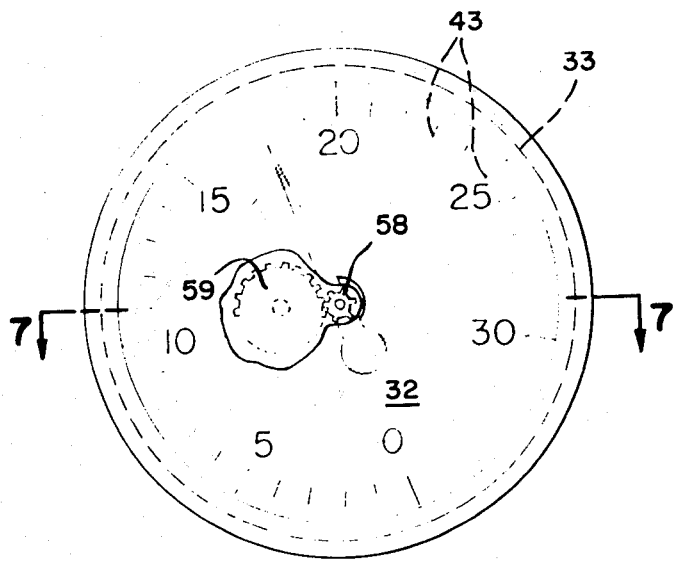
FIG. 6 is a front elevational view of the angle of attack meter mounted on the instrument panel of the aircraft as indicated by line 6—6 in FIG. 1. A portion of the face plate is broken away to reveal the underlying structure.
Figure 9:
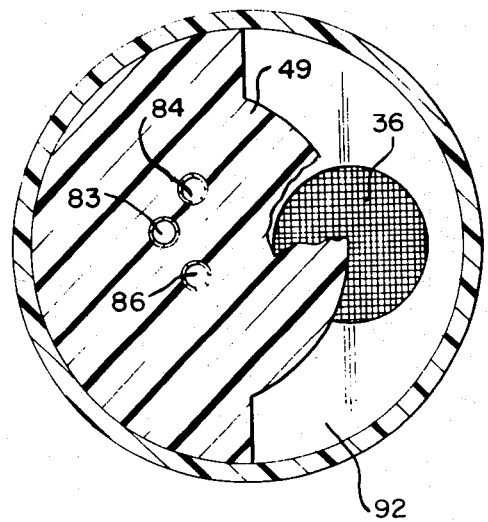
FIG. 9 is a vertical cross sectional view taken in the plane indicated by the line 9—9 in FIG. 7.
Figure 16:
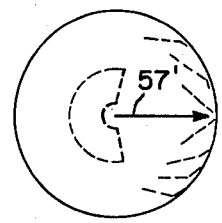
FIG. 16 is a schematic view of an alternate embodiment of the meter in which the rotor is provided with an indicator or pointer affixed to it or printed upon it, and rotatable therewith to sweep across an appropriate scale (not shown).

Referring to FIG. 16, there is shown schematically an embodiment of the invention in which the rotor 7 is provided with a pointer 57' printed directly thereon for a direct indication of angle of attack in relation to an appropriate scale (not shown) instead of the structure illustrated in FIGS. 6 and 7 where the pointer 57 is separately mounted on shaft 54 and driven by gears 58 and 59. The structure of FIG. 16 is thus simplified by elimination of such gears, thus reducing the possibility of a malfunction.

Figure 17:
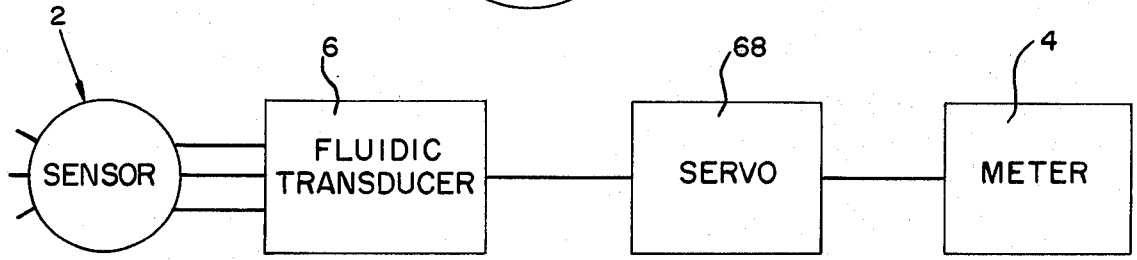
FIG. 17 is a schematic view illustrating the use of the sensor illustrated in FIGS. 3 through 5 with a fluidic transducer as illustrated in FIGS. 7 and 8 with the output from such fluidic transducer being imposed on a servo mechanism which is in turn connected to the meter.
Figure 18:
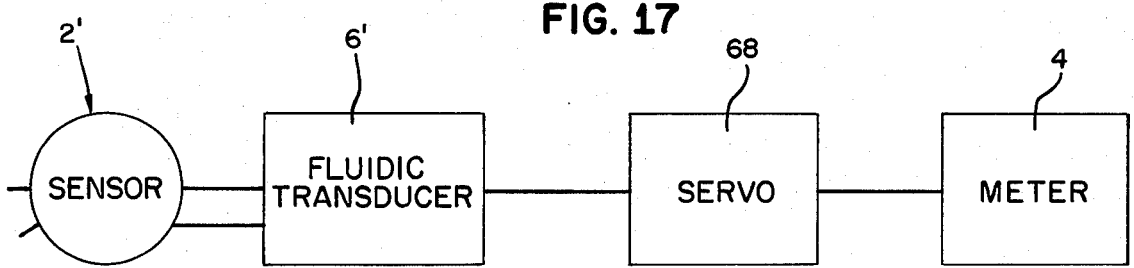
FIG. 18 is a schematic view similar to FIG. 17 but utilizing the sensor illustrated in FIG. 15 which is shown connected to a fluidic transducer the output from which is directed to a servo mechanism which controls the meter.

FIG. 17 is a diagrammatic illustration in which the three-port sensor unit 2 is connected to a suitable fluidic transducer such as the combination of the fluidic amplifier 6 and the transducer (rotor) 7, or as shown in the Kampe et al U.S. Pat. No. 3,780,771, which is in turn connected with a servo mechanism which is itself then connected mechanically or electrically to the meter 4. FIG. 18 shows diagrammatically the sensor 2' having only two ports, connected by appropriate conduits to the fluidic transducer 6' which is in turn connected mechanically or with a servo to the meter 4 as previously discussed. It should be understood that in the embodiments of the invention illustrated in FIGS. 17 and 18 the output from the fluid transducer or amplifier constitutes a jet of air which in terms of volume and direction is the sum total of either the two or three jets of air fed into the fluidic amplifier and which when combined with each other, result in a single jet having a predetermined direction, volume and velocity.

Figure 19:
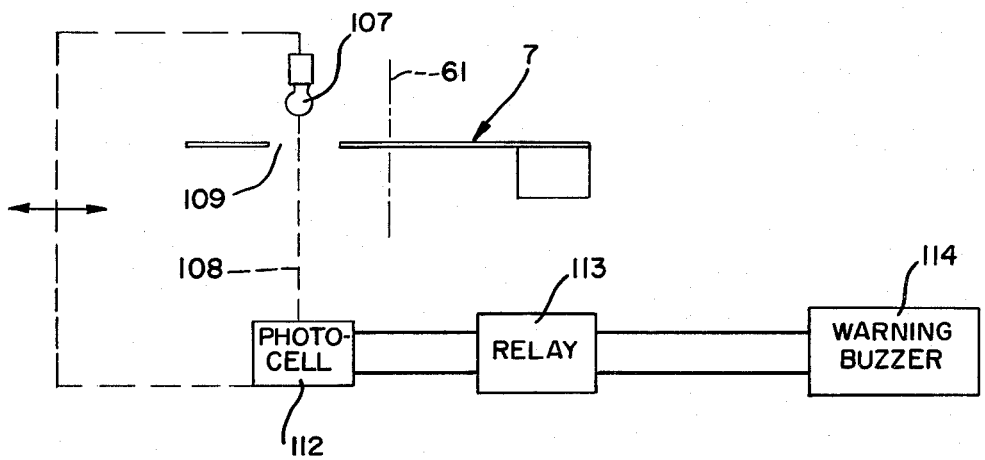
FIG. 19 is a schematic view illustrating the rotor forming a part of this invention under the control of a fluidic transducer working in cooperation with a light source and a photo cell which is in turn connected to a relay adapted to energize a warning buzzer to provide an audible warning in addition to a visual warning that a critical angle of attack is being achieved.

It will be apparent however, as illustrated in FIG. 19, that this type of rotor assembly may be utilized in conjunction with a light source 107, the light beam 108 of which is adapted to pass through a suitable aperture 109 formed in the rotor to energize a photocell 112 which in turn controls a relay 113 that activates a warning buzzer 114 to alert the pilot that a stall condition is approaching. As can be seen, the utilization of a freely rotatable rotor 7 or other transducer responding to the output from a fluidic amplifier may be utilized in several different ways to accomplish the purpose intended within the scope and spirit of the invention.

Having thus described the invention, what is considered to be novel and sought to be protected by Letters Patent of the United States is as follows:

I claim:

1. As an article of manufacture, a fluid transducer, comprising:
    (a) a fluidic amplifier adapted to continuously receive a plurality of separate inwardly directed fluidic input functions possessing individual characteristics and combined by said fluidic amplifier to produce a single fluidic output function the characteristics of which constitute the vector sum of the characteristics of said plurality of separate inwardly directed fluidic input functions; and
    (b) rotor means having a circumferential portion operatively associated with said fluidic amplifier and rotatably responsive to said single fluidic output function to indicate by the extent and direction of its rotation the characteristics of said single fluidic output function, said rotor including a plurality of vanes situated about at least a part of the circumferential portion, two of said vanes define an aperture which cooperates with the single fluidic output function to retain the rotor in a stabilized position, with the remaining vanes serving to provide rotation of the rotor toward the stabilized position.

2. The combination according to claim 1, in which indicia means are provided on said rotor means, and a calibrated scale associated therewith, whereby said indicia means on the rotor may indicate on said calibrated scale a condition correlated to the characteristics of said single fluidic output function.

3. An angle of attack sensing and indicating apparatus for aircraft having lift-producing wing surfaces, comprising:
    (a) sensor means adapted to be mounted on the aircraft so as to be exposed to and sense the direction of the relative wind in relation to the lift-producing wing surfaces, said sensor means including at least two air pressure detecting means, exposed to the relative wind each for producing thereby a respective flow of air in said sensor means at a given pressure;
    (b) indicator means for indicating the angle of attack of the lift-producing wing surfaces with respect to the relative wind; and
    (c) means connecting said sensor means with said indicator means for conveying each air flow continuously from said at least two air pressure detecting means to said indicator means, wherein said indicator means comprises:
        (i) fluidic amplifier means connected to said connecting means for continuously receiving each of said air flows as inputs and combining the air flows to produce an output air flow having a direction correlated to the relative wind and defined by the difference in pressures of each air flow received as inputs; and
        (ii) a rotor having a circumferential portion and mounted for rotation relative to the fluidic amplifier means and receiving from the fluidic amplifier means the output air flow, said rotor including a plurality of vanes situated about at least part of the circumferential portion of the rotor, two of said vanes defining an aperture through which the output air flow passes from said rotor to retain the rotor in a stabilized position correlated to the angle of attack, the remaining vanes serving to produce rotation of the rotor toward a stabilized condition when engaged by the output air flow until the output air flow aligns with said aperture defined by said two of said vanes, the degree of said rotation being an indication of the angle of attack of said lift-producing wing surfaces.

4. The apparatus according to claim 3, in which said sensor means comprises a hollow body and said pressure detecting means comprises apertures therein each adapted to be exposed to and impacted by a discrete segment of the relative wind whereby a plurality of air flows are continuously admitted by said apertures to pass therefrom to said indicator means.

5. The apparatus according to claim 3, in which said sensor means comprises a body having an arcuate surface exposed to the relative wind and said pressure detecting means comprises apertures in said arcuate surface impacted by said wind whereby a discrete segment of air constituting a column of said air is continuously admitted by each said aperture to pass continuously therefrom to said indicator means.

6. The apparatus according to claim 3, in which said pressure detecting means comprises a plurality of apertures formed in the leading edge of at least one of said lift-producing wing surfaces, each of said apertures being connected with said indicator means by said connecting means, whereby in use air flows continuously inward in discrete segments from each said aperture to said indicator means.

7. The apparatus according to claim 3, in which said sensor means includes a cylindrical body generally symmetrical about a longitudinal axis and having apertures therein symmetrically positioned in relation to a plane which includes said longitudinal axis and bisects the cylindrical surface of said cylindrical body, each of said apertures comprising an air pressure detecting means connected by said connecting means with said indicator means whereby in use air flows continuously inward from each said sensor aperture to said indicator means.

8. The apparatus according to claim 3, in which said fluidic amplifier is adapted to receive each of said air flows as a plurality of discrete inputs from said sensor means in the form of separate columns of air flowing continuously inward from said sensor, and said rotor being mounted in relation to said fluidic amplifier means to respond to said output air flow which comprises the vector sum of said separate columns of air passing therethrough to effect rotation of said rotor.

9. The apparatus according to claim 3, in which said indicator means includes a housing having a plate therein bearing indicia representing different angles of attack of said lift-producing wing surfaces, said fluidic amplifier means being mounted within the housing and being connected to said sensor means by said connecting means to receive each of said air flows constituting dynamic inputs thereto, said rotor being mounted within the housing in association with said fluidic amplifier, and including a pointer mounted for rotation in response to rotation of said rotor to indicate on said indicia bearing plate the angle of attack of said lift-producing wing surfaces.

10. The apparatus according to claim 3, in which said pressure detecting means includes at least two separate and spaced apertures each adapted to receive continuously and pass therethrough a segment of the relative wind, the vector sum of said air segments being adapted to pass as a single jet of continuously flowing air from said fluid amplifier means, and said rotor being rotatably responsive to said single jet of continuously flowing air emanating from said fluidic amplifier means, and in which said means connecting said sensor means with said indicator means comprise a plurality of tubes connecting said apertures with said fluidic amplifier whereby a plurality of continuously flowing columns of air flow inwardly from said sensor means to said indicator means.

11. The apparatus according to claim 7, in which said apertures are elongated slots, one of said slots being included in said plane which includes the longitudinal axis of said cylindrical body.

12. The apparatus according to claim 7, in which three apertures are provided, one of said apertures being included in said plane which includes the longitudinal axis of said cylindrical body, and the remaining two apertures being spaced on opposite sides of said plane.

13. The apparatus according to claim 9, in which means are provided on said housing for venting the vector sum of said separate continuously flowing air streams from the interior of the housing to the ambient atmosphere outside the aircraft.

14. An apparatus for sensing and indicating the direction of relative motion between a fluid stream and a body immersed therein and for sensing and indicating variations in the direction of relative motion therebetween, comprising:
(a) sensor means adapted to be mounted on said body and therewith to be immersed in said fluid stream so as to be exposed to sense the direction of the fluid stream in relation to said body, said sensor means including at least two fluid stream pressure detecting means, exposed to the fluid stream each for producing thereby a respective flow of fluid in said sensor means at a given pressure;
(b) indicator means for indicating the direction of relative motion between the fluid stream and said body; and
(c) means connecting said sensor means with said indicator means for conveying each fluid flow from said at least two fluid stream pressure detecting means to said indicator means, wherein said indicator means comprises:
(i) fluidic amplifier means connected to said connecting means for continuously receiving each of said fluid flows as inputs and combining the fluid flows to produce an output fluid flow having a direction correlated to the direction of the fluid stream and defined by the difference in pressures of each fluid flow; and
(ii) a rotor having a circumferential portion and mounted for rotation relative to the fluidic amplifier and receiving from the fluidic amplifier the output fluid flow, said rotor including a plurality of vanes situated about at least part of the circumferential portion of the rotor, two of said vanes defining an aperture through which the output fluid flow passes from said rotor to retain the rotor in a stabilized position correlated to the direction of relative motion, the remaining vanes serving to produce rotation of the rotor toward a stabilized position when engaged by the output fluid flow until the output fluid flow aligns with said aperture defined by said two of said vanes, the degree of said rotation being an indication of the direction of relative motion of said body.

15. The apparatus according to claim 14, in which said sensor means includes a plurality of ports or apertures exposed to and impacted by said fluid stream and individually transmitting fluid to said fluidic amplifier in said indicator means whereby segments of said fluid stream in the form of said fluid flows comprising separate jet segments of continuously flowing fluid are separately communicated to said fluidic amplifier, the velocity and volume of each segment of said fluid stream imposed on said fluidic amplifier being related to the direction of relative motion of said fluid stream and said body, means in said fluidic amplifier for combining said separate inwardly flowing fluid stream segments to produce a single jet of said fluid as said output flow having a velocity and direction that is the vector sum of all said separate fluid stream segments.

16. The apparatus according to claim 14, in which said sensor means includes a surface upon which said fluid stream may impinge in all attitudes of said body in said fluid stream to thereby create a dynamic fluid pressure gradient distributed over a selected portion of said surface, said dynamic fluid pressure gradient varying symmetrically from a maximum value to minimum values on opposite sides of a plane parallel to the direction of motion of said fluid stream, and a plurality of ports in said surface normally arranged in spaced relation within the boundaries of said pressure gradient whereby a variation in the direction of relative motion of said fluid stream in relation to said body effects a repositioning of said ports in relation to the boundaries of said dynamic fluid pressure gradient whereby more or less dynamic fluid pressure is imposed on said ports correlated to the positions of said ports in relation to the dynamic fluid pressure gradient as determined by the direction of relative motion of said fluid stream in relation to said body.

17. The apparatus according to claim 14, in which said indicator means comprises a fluidic transducer adapted to receive as inputs from said sensor a plurality of columns of continuously flowing fluid correlated to the direction of relative motion of said fluid stream in relation to said body and adapted to indicate said direction of relative motion and variations thereof.

18. As an article of manufacture, a fluid transducer, comprising:
 (a) a fluidic amplifier adapted to continuously receive a plurality of separate inwardly directed fluidic input functions possessing individual characteristics and combined by said fluidic amplifier to produce a single fluidic output function the characteristics of which constitute the vector sum of the characteristics of said plurality of separate inwardly directed fluidic input functions; and
 (b) means operatively associated with said fluidic amplifier responsive to said single fluidic output function to indicate the characteristics of said single fluidic output function, said means including a rotor rotatably mounted about an axis and in operative association with said fluidic amplifier, and a plurality of rotor vanes on said rotor spaced from said axis of rotation and adapted to be impinged by said single fluidic output function to thereby rotate said rotor to an extent correlated to the characteristics of said single fluidic output function to thereby indicate said characteristics.

* * * * *